US010268383B2

(12) United States Patent
Erden et al.

(10) Patent No.: US 10,268,383 B2
(45) Date of Patent: Apr. 23, 2019

(54) SELECTABLE READ MODES FOR A TWO DIMENSIONAL MAGNETIC RECORDING SYSTEM

(71) Applicant: Seagate Technology LLC, Cupertino, CA (US)

(72) Inventors: Mehmet Fatih Erden, St. Louis Park, MN (US); Scott Warmka, Burnsville, MN (US); Mark Allen Gaertner, Vadnais Heights, MN (US); Jon D. Trantham, Chanhassen, MN (US)

(73) Assignee: Seagate Technology LLC, Cupertino, CA (US)

(*) Notice: Subject to any disclaimer, the term of this patent is extended or adjusted under 35 U.S.C. 154(b) by 6 days.

(21) Appl. No.: 15/256,893

(22) Filed: Sep. 6, 2016

(65) Prior Publication Data

US 2018/0067647 A1 Mar. 8, 2018

(51) Int. Cl.
*G06F 3/06* (2006.01)
*G11B 5/012* (2006.01)
*G11B 5/48* (2006.01)

(52) U.S. Cl.
CPC .......... *G06F 3/061* (2013.01); *G06F 3/0658* (2013.01); *G06F 3/0659* (2013.01); *G06F 3/0676* (2013.01); *G11B 5/012* (2013.01); *G11B 5/4886* (2013.01)

(58) Field of Classification Search
CPC ...... G06F 3/061; G06F 3/0613; G06F 3/0688; G06F 3/0658; G06F 3/0659; G06F 3/0676; G11B 5/4886; G11B 5/4976; G11B 5/29; G11B 5/397; G11B 5/3977; G11B 5/82; G11B 2020/1238; G11B 5/012
See application file for complete search history.

(56) References Cited

U.S. PATENT DOCUMENTS

| 5,671,099 | A  | * | 9/1997 | Ishii ........................ G11B 19/00 360/60 |
| 5,872,997 | A  | * | 2/1999 | Golson ................... G06F 3/0613 360/74.1 |
| 6,480,934 | B1 | * | 11/2002 | Hino ...................... G06F 3/0605 711/114 |
| 7,599,139 | B1 |  | 10/2009 | Bombet et al. |
| 9,001,446 | B1 |  | 4/2015 | Wilson et al. |
| 9,013,821 | B1 |  | 4/2015 | Chen |
| 9,070,406 | B1 |  | 6/2015 | Li et al. |
| 9,093,119 | B1 | * | 7/2015 | Hwang ............ G11B 20/10009 |
| 9,153,264 | B1 | * | 10/2015 | Oberg ................ G11B 5/59627 |
| 9,286,926 | B1 |  | 3/2016 | Dhanda et al. |
| 9,336,803 | B1 |  | 5/2016 | Wilson et al. |
| 9,495,981 | B1 | * | 11/2016 | Biskeborn .......... G11B 15/1883 |
| 2006/0028753 | A1 | * | 2/2006 | Al-Azzawi ........... G06F 21/567 360/63 |
| 2011/0283121 | A1 | * | 11/2011 | Kuroda ................. G06F 1/3203 713/310 |

(Continued)

*Primary Examiner* — Hiep T Nguyen
(74) *Attorney, Agent, or Firm* — Hollingsworth Davis, LLC (57) ABSTRACT

Two or more read modes of a data storage system and device are defined. The data storage device is capable of concurrently reading from two or more tracks using two or more read transducers. The read modes utilize different numbers of the two or more read transducers while reading data. The read modes are selected based on an operating condition of the data storage system or device.

20 Claims, 5 Drawing Sheets

(56) References Cited

U.S. PATENT DOCUMENTS

| | | | | |
|---|---|---|---|---|
| 2014/0239731 A1* | 8/2014 | Ito | ............ | H02J 17/00 307/104 |
| 2015/0255092 A1* | 9/2015 | Macken | ............... | G11B 5/3958 360/324 |
| 2015/0294690 A1* | 10/2015 | Kanamaru | ............. | G11B 27/36 360/31 |
| 2015/0332719 A1* | 11/2015 | Mendonsa | ............... | G11B 5/09 360/77.08 |
| 2017/0075771 A1* | 3/2017 | Matsui | ................ | G06F 11/1451 |
| 2017/0103781 A1* | 4/2017 | Lammers | ......... | G11B 20/10212 |
| 2017/0162224 A1* | 6/2017 | Mathew | ........... | G11B 20/10212 |
| 2017/0287514 A1* | 10/2017 | Rausch | ................. | G11B 5/607 |

* cited by examiner

SELECTABLE READ MODES FOR A TWO DIMENSIONAL MAGNETIC RECORDING SYSTEM

SUMMARY

The present disclosure is directed to selectable read modes for a two-dimensional magnetic recording data storage device. In one embodiment, two or more read modes of a data storage device are defined. The data storage device is capable of concurrently reading from two or more tracks using two or more read transducers. The two or more read modes utilize different numbers of the two or more read transducers while reading data. The two or more modes are selected to read based on an operating condition of the data storage device.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., hard disks. Magnetic recording media surface, in principle, provides a two-dimensional environment. Conventional magnetic recording (CMR) and the resulting drive architecture generally constrain what is inherently a 2-D system to 1-D system. These constraints have historically been due to cost and complexity. New technologies based on Heat Assisted Magnetic Recording (HAMR) and Bit Patterned Media (BPM) recording target higher areal density (AD) while assuming conventional 1-D system design and drive architecture. These technologies rely on advances in write transducers and media to enable smaller bit sizes to be recorded to a magnetic disk.

Other recording technologies have been developed to increase AD using conventional read and write transducers. For example, Shingled Magnetic Recording (SMR) involves recording data tracks that partially overlap a previously written, adjacent track. This allows making the tracks narrower than would otherwise be possible for a given write head in conventional recording. Similarly, Interlaced Magnetic Recording (IMR) uses alternating wider and narrower tracks that partially overlap each other, which also results in narrower tracks than what is possible in conventional recording.

In parallel to these technology alternatives, the constraints limiting the overall design to 1-D are being further explored to see if existing and future recording technology can support higher AD and/or better drive performance if some of those constraints are modified by making the system utilize the 2-D nature of the media surface. This technology is referred to as Two-Dimensional Magnetic Recording (TDMR).

One of the embodiments of TDMR is called TDMR Multi-Track (TDMR-MT) recording, which is proposed for both improvement in Sequential Read Performance (Seq-R-Perf) and AD. The TDMR-MT architecture is generally based on combing data of two or more adjacent tracks. This may involve encoding the write requests using 2-D channel encoder or multiple 1-D channel encoders. The encoded write requests are buffered, and the buffered requests are interleaved appropriately among adjacent tracks on the recording medium. The write requests on adjacent tracks may be interleaved using a single writer with multiple spins.

Reading in a TDMR-MT system may involve reading simultaneously from two or more adjacent tracks. For example, multiple readers may be built on the same Head Gimbal Assembly (HGA). The multiple readers are arranged so they can be positioned over adjacent tracks of interest, so the adjacent tracks may be read using multiple readers during a single spin.

The user information can be decoded from equalized signals using a 2-D channel code or multiple 1-D channel codes. In order to optimize AD, TDMR-MT architecture encodes the write requests using appropriate channel codes, and writes them at adjacent tracks. This yields more coding gain, and hence increases AD. A TDMR-MT device may be able to squeeze tracks more (e.g., at an increased tracks-per-inch density) during the write process to gain AD. During reading, the TDMR-MT device then activates multiple readers, and may use a 2-D equalizer, detector algorithms, and channel codes to detect and decode the information used at all the adjacent tracks. This can improve the Seq-R-Perf metric, because there is already a part of the write request interleaved at the adjacent tracks when the multiple readers are accessing those tracks.

While the TDMR-MT architecture helps AD and Seq-R-Perf, it can potentially have a negative impact on write performance. For example, using 2-D encoding to improve AD and interleaving write requests may mean that writing or refreshing the data on one track involves writing or refreshing the data on an adjacent track. The use of multiple read transducers can increase the required power for certain read requests, e.g., reads that can be fulfilled by reading a single track (or partial track) using a single read transducer. In such a case, all the readers may be activated together with 2-D equalizer, detector and channel codes to recover the user information written at adjacent tracks, even if such adjacent track information is not strictly needed.

Figure 1:
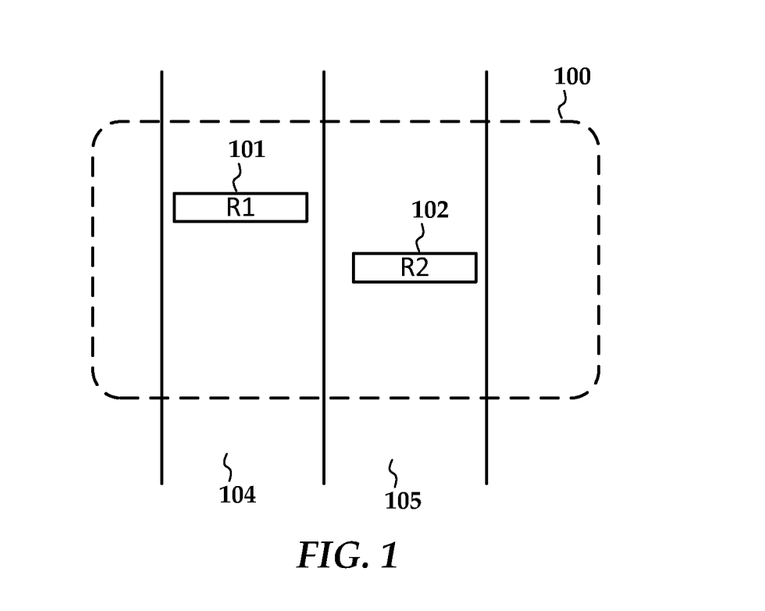
FIG. 1 is a diagram of a two-dimensional magnetic recording track and reader configuration according to an example embodiment.

In this document, a TDMR-MT recording architecture is described that can be optimized in terms of performance (both write and read) and power by compromising AD. In FIG. 1, a block diagram illustrates a TDMR-MT track arrangement according to an example embodiment. Two or more read transducers 101, 102 are commonly mounted to a structure 100 such as a read/write head or HGA. The read transducers 101, 102 can be activated simultaneously to read from multiple tracks, in this case the transducers 101, 102 are centered over two tracks 104, 105. More than two read transducers may be embedded within the common structure 100, and some read transducers may straddle two tracks. The number of read transducers need not correspond to the number of tracks. For example, M read transducers may be used to read N tracks, where M>N. The tracks 104, 105 may be conventional, shingled, or interlaced.

Generally if data written at the adjacent tracks 104, 105 are part of the same read request, all the adjacent track information can be retrieved with a single spin utilizing the multiple readers 101, 102 and 2-D channel architecture (e.g., 2-D equalizer, detector, and channel codes). Simultaneously decoding the tracks in this way is more power efficient than recovering each track with multiple spins utilizing a subset of readers mainly on a single track and further using a reduced complexity 2-D channel architecture (or, conventional 1-D channel architecture).

If the data written at adjacent tracks are not part of the read request, then activating all the readers, utilizing 2-D channel architecture, and performing full error correction on both tracks may be overkill from power perspective if some of the data is unwanted or if it is possible to recover the data of interest in other ways. For example, for a given channel system on a chip (SoC), it might require 4 watts to recover a data written at single track, but might require 7 watts to recover the data written at 2 adjacent tracks. Thus, if the adjacent track data is a part of the read request, involving all the readers and the appropriate channel architecture burns 7 watts, instead of 8 watts (the latter being two times 4 watts to read and recover a single track). However, if the adjacent track data is not required, then burning 7 watts will be overkill since it might be done instead at 4 watts.

In some embodiments, a server may be configured to select between multi-track (MT) and single-track (ST) reader mode. The MT mode activates all circuitry to simultaneously read and recover the data from two tracks simultaneously. ST mode activates only the subset of the circuitry necessary to recover a single track at a time. For example, when the server is running into power-constraints, it may be possible to drop from MT down to ST mode for one or more drives. A server may be able to support a few, but not many, drives above 12 watts. With this feature the server could budget its power by selectively choosing between MT and ST modes. The drive would then issue its reads accordingly. A similar approach can also be done for server temperature management. If temperatures rise above a threshold, then a select number of drives can be put into a lower power, e.g., ST, mode. Alternately, the drive can sense aspects of its ambient environment and make the selection between MT and ST automatically. For example, the drive can drop to ST mode when it detects the ambient temperature is above a pre-determined threshold.

Figure 2:
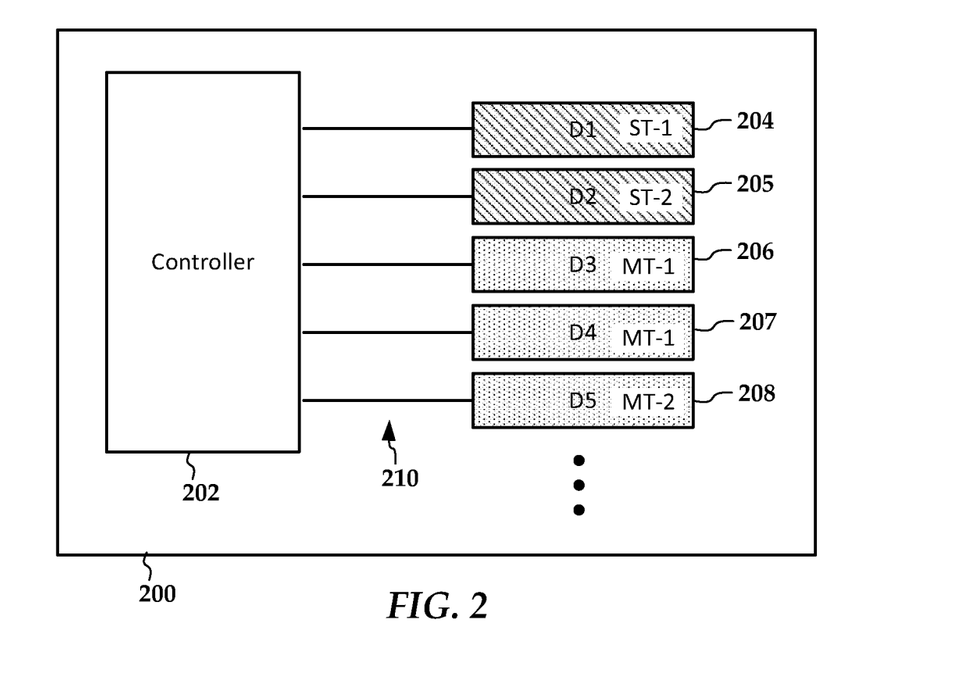
FIG. 2 is block diagram illustrating a server according to an example embodiment.

In FIG. 2, a block diagram illustrates a server or system 200 according to an example embodiment. The server or system 200 includes a system controller 202 that controls at least storage functions of the server or system 200. The controller 202 may include a central processing unit, volatile memory, input-output (I/O) busses, storage-specific processors (e.g., RAID controllers), etc. The controller is coupled to a plurality of storage devices 204-208 via signal lines 210 (in some embodiments those storage devices can be hard disk drives). The signal lines 210 include I/O lines used for storing and retrieving user data from the storage devices 204-208. The controller 202 is also configured to set different modes of the storage devices 204-208 via the signal lines 210. For example, a command descriptor block of a host interface protocol may be used to set or select the modes. The host interface protocol may be a protocol, such as SATA, SAS, NVMe, Ethernet, etc., used for communicating with the plurality of data storage devices. Alternately, the control and communication between system and drive may be performed "out-of-band". For example the control may be performed over some communication channel outside of the host data interface, such as an I2C bus, RS232 bus, a discrete signal between the drive and the enclosure, etc.

It is sometimes advantageous to operate drives within a single enclosure in different operating modes. For example, an enclosure may include some drives as general purpose data storage drives, others as "hot spares", other drives as metadata stores, and other drives as RAID parity storage. As indicated in each of the drives 204-208, different ST or MT modes may be set for the drives 204-208 depending on system requirements, current operating conditions, etc. For example, drives 204 and 205 are set to different ST modes, while drives 206 and 207 are set to the same MT mode. The controller 202 may set all drives 204-208 to the same mode, or to individual different modes as shown. Further, the drives 204-208 may use different recording architectures to provide a target set of characteristics, e.g., AD, throughput, power consumption, etc. These architectures may be initially set before deployment of the server 200, although in some cases it may be possible to have a drive support multiple architectures, e.g., defining different architectures for different radial zones on the disks.

The drives 204-208 may be part of a parallel file system that distributes files and data between different servers on a network and different drives within a server. This use of the drives 204-208 may dictate which modes and architectures are set by default or dynamically in response to system load. The system controller 202 may use custom logical block address mapping to direct different types of storage traffic to subsets of drives having different modes or architectures, which can optimize performance of data storage devices in a two-dimensional magnetic recording configuration. For example, if a time-critical system operation such as a RAID rebuild is occurring, the system controller can set the affected drives to a maximum performance mode to minimize system down time.

Figure 3:
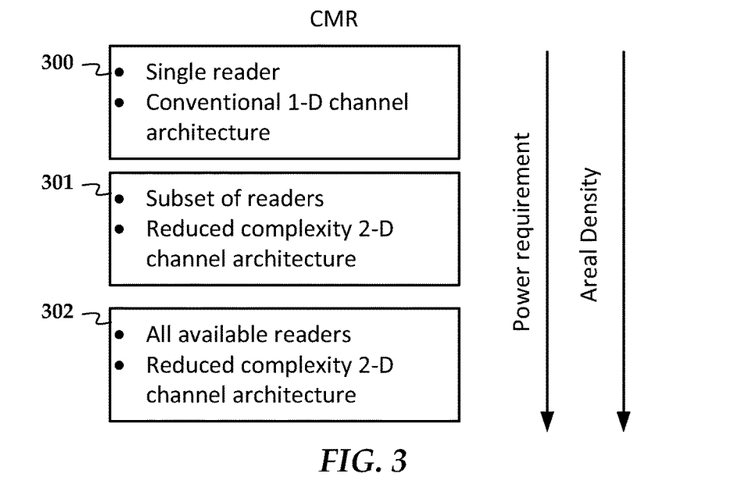
FIG. 3 is a block diagram of conventional magnetic recording architectures according to an example embodiment.
Figure 4:
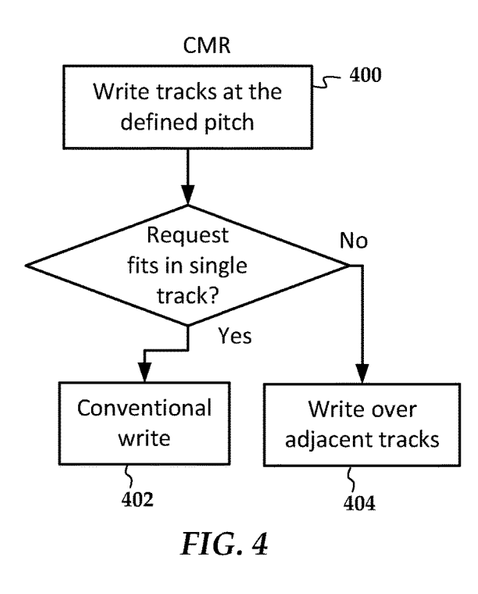
FIGS. 4 and 5 are flowcharts of conventional magnetic recording read and write processes according to an example embodiment.
Figure 5:
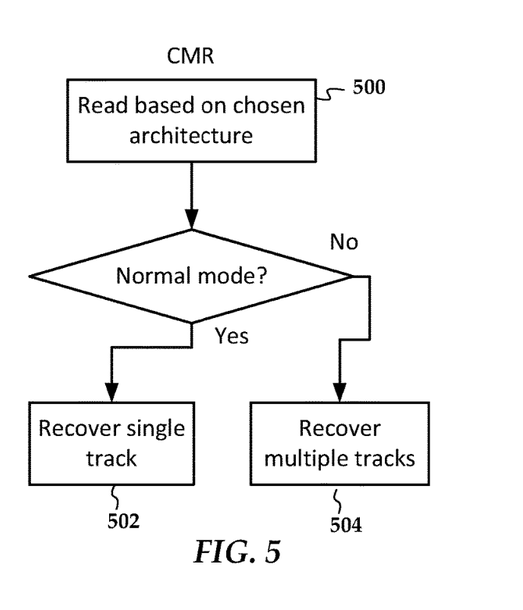

The embodiments described herein may be used in different types of storage devices, including CMR and SMR (or IMR) drives. In FIGS. 3-5, diagrams show an example embodiment of server operations utilizing CMR drives. In CMR, the goal is to write the data to the media surface as soon as possible with minimum tiers in between to obtain maximum write performance. On the other hand, TDMR-MT can utilize 2-D codes for improved AD and interleaving for Seq-R-Perf, both of which may have adverse effects on write performance. The proposed solution can negate negative effects on write performance. Generally, the solution involves choosing a system architecture (without 2-D inter-track channel coding) for a given power budget and AD requirement. Some of the illustrative examples architectures are shown in FIG. 3.

The first example architecture 300 yields least power requirement with least AD advantage. In this example, a single reader is chosen among all available on the HGA, and a conventional 1-D channel architecture is chosen. A second example 301 yields more AD but uses more power than the first example. In the second example architecture 301, a subset of readers is chosen among all available on the HGA. A reduced complexity 2-D channel architecture is chosen, e.g., a 2-D equalizer followed by multiple conventional 1-D detectors and 1-D channel code. A third example architecture 302 yields more AD and has a greater power requirement than both the previous examples 300, 301. In the third case 302, all available readers on the HGA are chosen for reading and a reduced complexity 2-D channel architecture is used, e.g., a 2-D equalizer followed by multiple multi-input-single-Output (MISO) detectors and 1-D channel code.

The write process in this CMR embodiment is shown in the flowchart of FIG. 4. For any of the example architectures 300-302, a track pitch is defined, and tracks are written 400 at the defined track pitch. For write requests that fit in a track, a conventional write process 402 is performed. For write requests that cover multiple tracks, writing continues 404 over multiple adjacent tracks.

The read process in this CMR embodiment is shown in the flowchart of FIG. 5. The tracks are read back 500 based on the chosen system architecture. Normal mode is to recover 502 a single track for a given time. Recovering multiple tracks 504 for a given time may optionally be performed for some situations. Examples of when multiple tracks are recovered 504 include when a read request spans more than single track and/or when the sector did not converge, and multiple reads are required in error recovery mode. Other situations where multiple tracks may need to be recovered 504 is during drive replication or RAID rebuild.

Figure 6:
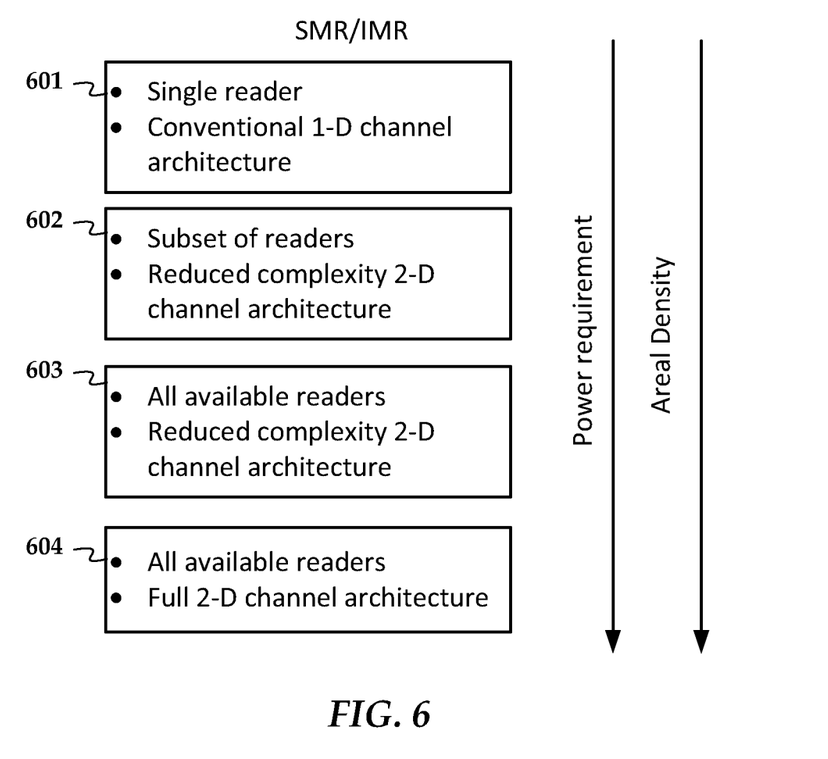
FIG. 6 is a block diagram of shingled magnetic recording architectures according to an example embodiment.
Figure 7:
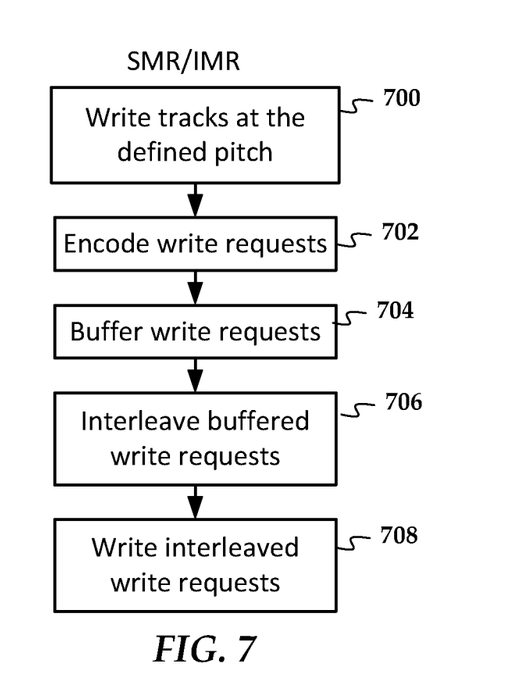
FIGS. 7 and 8 are flowcharts of shingled magnetic recording read and write processes according to an example embodiment.
Figure 8:
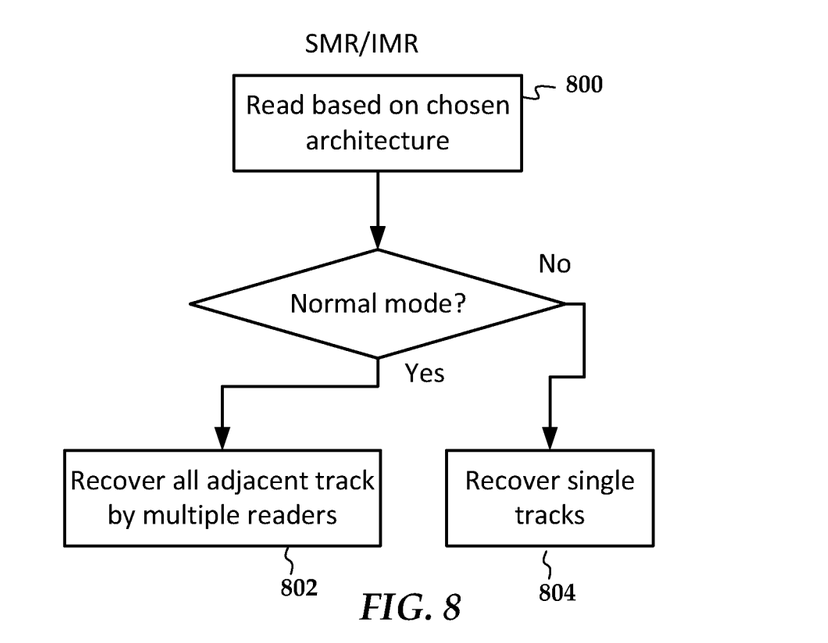

In FIGS. 6-8, diagrams show an example embodiment of server operations utilizing SMR (or IMR) drives. For SMR/IMR drives, write performance is not as constrained as CMR drives as there are already various media tiers between write request and the magnetic media surface. Thus, the solution for SMR/IMR may be similar to that of CMR except that the system architecture may be with or without 2-D inter-track channel coding for a given power budget and AD requirement. The diagram in FIG. 6 shows example architectures for SMR/IMR drives. Architectures 601-603 are similar to 301-302 shown in FIG. 3. An additional fourth example architecture 604 may be selected for SMR/IMR, where all available readers on the HGA are chosen for reading and a full 2-D channel architecture is used. An example of this full 2-D channel architecture includes a 2-D Equalizer followed by multiple Multi-Input-Single-Output (MISO) detectors and 2-D channel code.

The write process in this SMR/IMR embodiment is shown in the flowchart of FIG. 7. For any of the example architectures shown in FIG. 6, a track pitch is defined, and tracks are written 700 at the defined track pitch. Write requests are encoded 702 using 2-D channel encoder or multiple 1-D channel encoders. The encoded write requests are buffered 704, and the buffered write requests are interleaved 706 appropriately among the adjacent tracks. The interleaved write requests are written 708 on adjacent tracks using a single writer over multiple spins.

The read process in this SMR/IMR embodiment is shown in the flowchart of FIG. 8. A read 800 is based on the chosen system architecture. Normal mode is to recover 802 all adjacent tracks covered by multiple readers at a given time. Recovering single track 804 for a given time is provided as a feature when multiple tracks are not required to be recovered, such as when the read request spans only a single track and drive statistics indicate healthy operating state. Other situations when single track recovery 804 is used include when the sector did not converge, and recovering single track is sufficient during error recovery mode.

In this document, a power and performance optimized TDMR process is proposed for both CMR and SMR/IMR drive architectures. Overall, the proposed architectures burn less power per bit and do not have drastic adverse effects on performance figures. A server can be dynamically adjusted to change power or performance as needed.

In one embodiment, a storage server is a reconfigurable system that optimizes power and performance when reading and writing to storage device(s) capable of TDMR, including multi-track variants of TDMR, like TDMR-MT and multi signal (or sensor) magnetic recording ("MSMR") where multiple readers are simultaneously used for reading a single track or more than 1 tracks, respectively. The system is capable of using one or more read/write architectures based on power and/or performance requirements. The system may be reconfigured to utilize 1-D or 2-D encoding writes. The system may also be reconfigured to utilize fewer readers than are available on a HGA to save power or more readers to increase performance.

The system may be reconfigured to utilize various channel architectures (e.g., conventional 1-D reading and writing, 2-D reading with multiple 1-D detectors, 2-D reading with multi-input-single-output detectors, or 2-D reading and writing with multi-input-single-output detectors). For systems utilizing CMR, the channel architecture options may include only 1-D encoding, due to the emphasis in write performance. However, for systems utilizing SMR/IMR, the channel architecture options may further include 2-D encoding, because at least one media tier is typically available in addition to the main store to support write requests.

For CMR, the system may be configured for write performance by using 1-D encoding only and read power-saving by reading a single track at a time. The system may read multiple tracks when more read performance is needed but consume more power, such as for RAID rebuild, drive replication, read requests spanning more than one track, performing error recovery when a sector does not converge, speculative access (e.g., read look-ahead, speculative caching, predictive caching), or when certain sectors are suspected of not being robust.

For SMR/IMR, the system may be configured for areal density performance by writing with 2-D encoding and reading multiple tracks. However, the system may use 1-D encoding to save power. In addition, the system may read fewer than all tracks available to save power. For example, the system may read single tracks when a read request spans only a single track and drive statistics indicate a healthy operating state or performing error recovery when a sector does not converge but single track recovery is sufficient. Reading less than all tracks may also be used if a sector is healthy and reading all tracks is not needed.

The system can be configured before writing to a storage device. The system may also be dynamically reconfigurable. The system may be configured upon setup within the storage device or the host system. For example, configuration may be implemented in various ways, such as: the design of the storage device, commands to the storage device from a host system, logical block address (LBA) mapping, application on the host system, or a user configuration.

Figure 9:
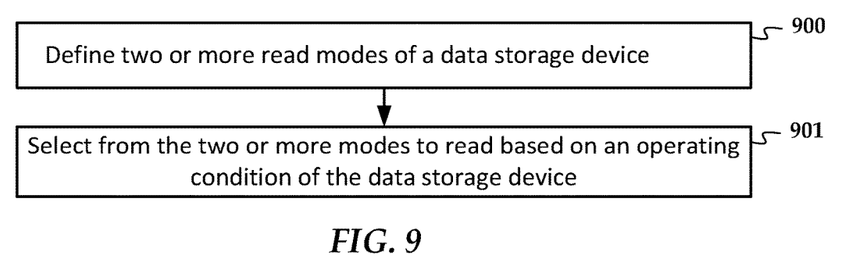
FIG. 9 is a flowchart of a method according to an example embodiment.

In FIG. 9, a flowchart shows a method according to an example embodiment. The method involves defining 900 two or more read modes of a data storage device that is capable of concurrently reading from two or more tracks using two or more read transducers. The two or more read modes utilize different numbers of the two or more read transducers while reading data. One of the two or more modes is selected to read based on an operating condition of the data storage device, e.g., target temperature, power consumption, performance, etc.

Figure 10:
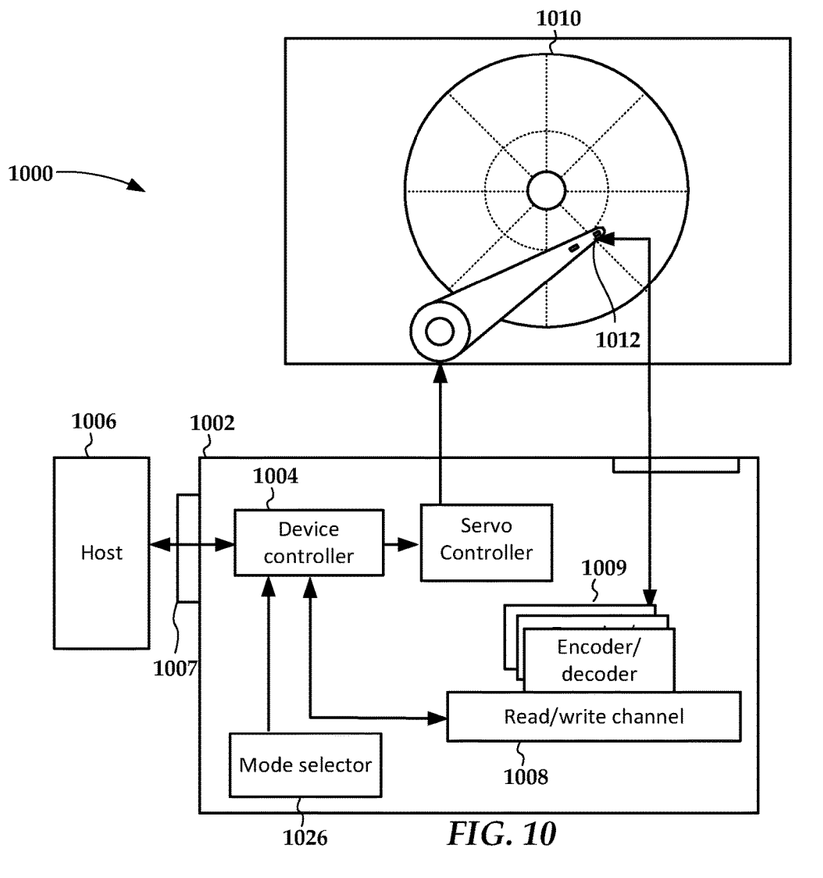
FIG. 10 is a block diagram of a storage device according to an example embodiment.

In FIG. 10, a diagram illustrates components of a hard drive apparatus 1000 that utilizes one or more HGAs 1012 according to example embodiments. The apparatus includes circuitry 1002 such as a device controller 1004 that processes read and write commands and associated data from a host device 1006 via a host interface 1007. The host interface 1007 includes circuitry that enables electronic communications via standard bus protocols (e.g., SATA, SAS, PCI, NVMe, Kinetic, etc.). The host device 1006 may include any electronic device that can be communicatively coupled to store and retrieve data from a data storage device, e.g., a computer, a server, a storage controller. The device controller 1004 is coupled to a read/write channel 1008 that reads from and writes to surfaces of one or more magnetic disks 1010 via HGAs 1012. Generally, the read transducers may be configured to read from a single reader (MSMR mode) or from more than one tracks (TDMR-MT mode). The read transducers can be selectively activated so that subsets of the two or more read transducers are activated at certain times.

The read/write channel 1008 may include analog and digital circuitry such as decoders, timing-correction units, error correction units, etc. In conjunction with selecting between different read transducers on the HGAs 1012, the read/write channel 1008 can select between multiple encoders 1009 to appropriately process data from the selected transducers.

A mode selector module 1026 is a functional component that can process a control message from the host 1006 via the host interface 1007. The message includes data (e.g., command descriptor block) that causes the mode selector module 1026 to select a different mode of the device 1000. For example, the read/write channel 1008 can send a signal to the HGAs 1012 to activate or deactivate readers based on the selected mode. An appropriate decoder 1009 can be selected for use with the selected readers. Other functionality, such as that of the servo controller 1016, clearance control (not shown), can also be altered by the change of mode in response to the mode selector 1026.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A system comprising:
   a plurality of data storage devices each comprising two or more read transducers capable of concurrently reading from tracks of a recording medium in a two-dimensional magnetic recording configuration; and
   a system controller coupled to the plurality of data storage devices via a respective plurality of host protocol signal lines and configured to define two or more read modes affecting at least a subset of the data storage devices, the read modes utilizing different numbers of the two or more read transducers while reading data, the plurality of data storage devices configured to select one of the two or more read modes in response to a command sent from the system controller to the plurality of data storage devices via the respective plurality of host protocol signal lines, the command sent based on an operating condition of the system.

2. The system of claim 1, wherein the system controller selects from the two or more read modes via a command descriptor block of a host interface protocol used for communicating with the data storage devices.

3. The system of claim 1, wherein the operating condition comprises a target power consumption of the system or a target operating temperature of the system.

4. The system of claim 1, wherein the operating condition comprises a RAID rebuild or drive replication of the system such that maximum performance is desired and the read mode with a greater number of activated read transducers is utilized.

5. The system of claim 1, wherein a first of the two or more read modes comprises using only one of the two or more read transducers of each of the plurality of data storage devices, and a second of the two or more read modes comprises using at least two of two or more read transducers of each of the plurality of data storage devices.

6. The system of claim 5, wherein the first mode utilizes one-dimensional detection, and the second mode utilizes two-dimensional detection.

7. The system of claim 5, wherein the tracks comprise shingled tracks, and the second mode comprises a default mode.

8. The system of claim 1, further comprising a custom logical block address mapping optimized for use with the data storage devices in the two-dimensional magnetic recording configuration, and a distributed parallel file system architected for use in the two-dimensional magnetic recording configuration.

9. A method comprising:
   defining, via a controller of a data storage device that is capable of concurrently reading from two or more tracks using two or more read transducers, two or more modes of the data storage device, the two or more modes utilizing different numbers of the two or more read transducers while reading data;
   receiving, via a host interface of the data storage device, a command to select one of the modes; and
   using the selected mode to read data from the data storage device based on the command.

10. The method of claim 9, wherein the selected mode reduces a power consumption of the data storage device.

11. The method of claim 9, wherein the selected mode reduces an operating temperature of the data storage device.

12. The method of claim 9, wherein a first of the modes comprises using only one of the two or more read transducers, and a second of the modes comprises using at least two of the two or more read transducers.

13. The method of claim 12, wherein the first mode utilizes one-dimensional detection, and the second mode utilizes two-dimensional detection or multi-signal magnetic detection.

14. The method of claim 12, wherein the two or more tracks are shingled tracks, and the second mode is a default mode.

15. The method of claim 12, wherein the two or more tracks are conventional tracks, and the first mode is a default mode.

16. A data storage device comprising:
   channel circuitry configured to communicate with two or more read transducers operable to concurrently read from tracks of a recording medium in a multiple-sensor magnetic recording configuration;
   a host interface circuitry configured to communicate with a host; and a controller coupled to the channel circuitry and host interface circuitry, the controller configured to:
define two or more read modes of the data storage device each utilizing different numbers of the two or more read transducers while reading data; and
use a selected one of the two or more read modes based on command received from the host that selects the selected mode.

17. The data storage device of claim 16, wherein the two or more tracks are shingled tracks, and wherein the second mode is a default mode.

18. The data storage device of claim 16, wherein the two or more tracks are conventional tracks, and wherein the first mode is a default mode.

19. The data storage device of claim 16, wherein the two or more modes further use different decoding schemes.

20. The data storage device of claim 16, wherein the selected mode is based on at least one of target power consumption and a target operating temperature of the data storage device.

* * * * *